United States Patent [19]
Tsuchida et al.

[11] Patent Number: 5,792,405
[45] Date of Patent: Aug. 11, 1998

[54] MACHINE AND METHOD FOR PRODUCING AN AUTOMOBILE WINDSHIELD MOLDING

[75] Inventors: Katsushi Tsuchida; Masahiro Sekido, both of Ibara, Japan

[73] Assignee: Katayama Kogyo Kabushiki Kaisha, Okayama, Japan

[21] Appl. No.: 691,311

[22] Filed: Aug. 2, 1996

[51] Int. Cl.⁶ ............................ B29C 47/16; B29C 47/92
[52] U.S. Cl. .................. 264/146; 156/244.18; 264/167; 264/177.16
[58] Field of Search ................ 264/167, 177.1, 264/177.16, 145, 146; 156/244.18

[56] References Cited

U.S. PATENT DOCUMENTS

| | | | |
|---|---|---|---|
| 4,765,936 | 8/1988 | Ballocca | 264/177.1 |
| 5,112,547 | 5/1992 | Nakashima et al. | 264/167 |
| 5,133,537 | 7/1992 | Shirahata et al. | 296/93 |
| 5,162,090 | 11/1992 | Arima | 264/167 |
| 5,167,893 | 12/1992 | Yada et al. | 264/177.16 |
| 5,174,623 | 12/1992 | Yada et al. | 296/93 |
| 5,190,338 | 3/1993 | Yada | 264/40.7 |
| 5,203,946 | 4/1993 | Tamura et al. | 156/244.18 |
| 5,229,054 | 7/1993 | Yada et al. | 264/167 |
| 5,445,780 | 8/1995 | Yada et al. | 264/167 |
| 5,489,409 | 2/1996 | Koganezawa et al. | 264/177.16 |
| 5,507,992 | 4/1996 | Yada et al. | 264/177.16 |
| 5,567,368 | 10/1996 | Ando et al. | 264/167 |

Primary Examiner—Jeffery R. Thurlow
Attorney, Agent, or Firm—Smith Patent Office

[57] ABSTRACT

An automobile windshield molding for a motor vehicle seals the space between a windshield and a periphery of a window opening of a vehicle body panel. A molding machine produces such an automobile windshield molding using a special molding method. The machine has a first plate and a second plate structured and arranged to allow some of the resin flow to be diverted from the extrusion opening when the cross section of the molding is changed. The machine includes a cutter for forming a water drain channel. The cutter has an opening for removing the cut away resin.

12 Claims, 5 Drawing Sheets

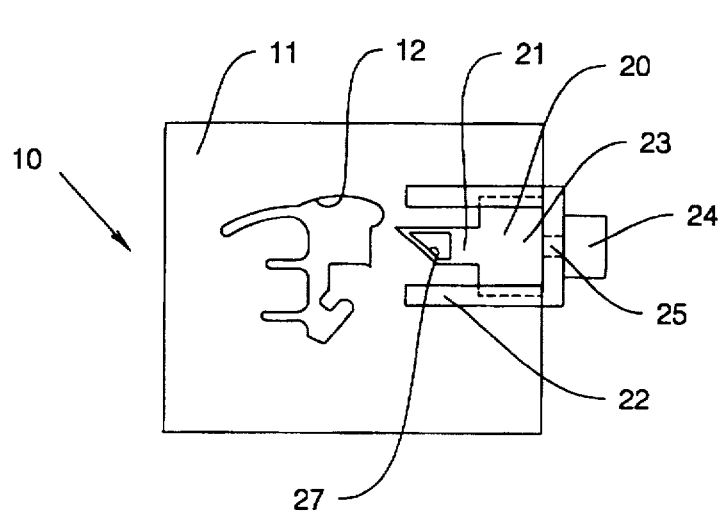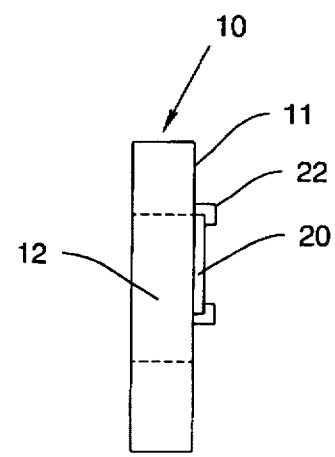
Fig. 7                               Fig. 8
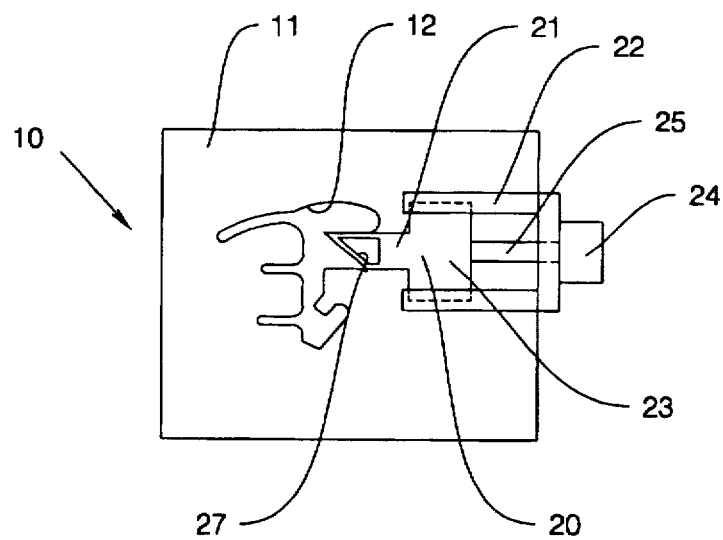
Fig. 9

MACHINE AND METHOD FOR PRODUCING AN AUTOMOBILE WINDSHIELD MOLDING

BACKGROUND OF THE INVENTION

1. Field of the Invention

This invention relates to an automobile windshield molding for a motor vehicle that will seal the space between a windshield and a periphery of a window opening of a vehicle body panel. The invention also relates to a molding machine for producing such automobile windshield molding.

2. Description of the Related Art

An automobile windshield molding is usually attached around an edge of a windshield to seal the space between a windshield and a window opening of a vehicle panel. The automobile windshield molding is typically attached directly to the vehicle body panel or is supported fixedly by a fastener mounted on the body panel.

Heretofore, this kind of windshield molding comprised side molding parts which are arranged in the right and the left sides of the windshield, respectively. The side molding parts have grooves to receive the windshield and a water drain channel located above said grooves; and an upper molding part which only has a groove to receive the windshield. Consequently the sides molding parts and the upper molding part are formed with different cross sections.

U.S. Pat. No. 5,167,893 and U.S. Pat. No. 5,174,623 describe windshield moldings with different cross sections for the side part and the upper part. These citations disclose a method of making a windshield molding, in which a shutter is provided in front of an extrusion-molding die to open and to slowly close an opening portion of the die so that a water drain channel is gradually formed in the molding.

In this method, flow of resin is interrupted by a die and a shutter when an extrusion opening area of the die is changed and the shutter protrudes in front of the die in order to change the cross section of the molding. Consequently, an extrusion rate of the material is changed. This results in a change in the flow rate of the material close to the surface of the molding so that keeping the surface uniform and smooth over the full surface becomes difficult. Therefore fine control of the extrusion rate of the molding material is required following a change in cross section in order to solve this problem. This leads to the need for precise control of an extrusion pressure resulting in complicated and expensive equipment. Furthermore, precise control of the extrusion pressure typically incurs some technical difficulty.

To overcome these inconveniences, a proposal has been made in Japanese Patent Laid-Open publication 246815/1994. In this reference, a moving die is placed in an extrusion opening formed in a first plate in order to control the cross section of the extrusion opening and at the same time the moving die provides a first escape opening to dispose of resin separated from a molding main body when the extrusion opening is narrowed down. A moving cutter is also placed movably on a discharge port of the first plate in order to form a water drain channel on the side of a large thickness portion. This structure means the moving cutter provides a second escape opening to dispose of the material cut off from the large thickness portion of the molding main body.

In the conventional molding method mentioned above, the required shape can be obtained while keeping the extrusion volume stable by disposing of the removed resin material out of the escape openings. As the moving die is moved in the extrusion opening, however, the back pressure on the surface of the moving die varies in a very sensitive manner. The sensitivity comes from the fixed area of the escape openings that can not keep the back pressure constant following movement of die. Although the fluctuation of the back pressure is greatly decreased by the effect of the escape openings compared with the conventional systems, the delicate pressure changes of the resin flow are still likely to result in a lower quality product. For instance, an exterior portion which does not change its cross section happens to have, in the worst case, an uneven surface over the whole molding.

The same result may also happen in the case of a movable cutter.

SUMMARY OF THE INVENTION

It is an object of the present invention to provide an automobile windshield molding in which a water drain channel is formed.

According to a first aspect of the present invention, a machine for producing an automobile windshield molding is provided comprising:

a supply means for supplying resin material;

a first plate which is placed in a discharge port side of the supply means providing an extrusion opening which forms an exterior portion, a foot portion and a large thickness portion between them;

a movable die is placed in the extrusion opening of the first plate which is movable and works to form the large thickness portion; and a movable cutter placed on the discharge port of the first plate and works to form a water drain channel on the side of the large thickness portion, characterized by a second plate which is placed between the supply means and the first plate and has similar shaped opening as that of the first plate with the exception that the second plate has a means to divide its openings into at least to two segments, in order to minimize the effect of the pressure fluctuation in the extrusion opening caused by the changing cross sections of the molding.

The dividing means of the second plate divides its opening into at least the exterior portion and the lower portion including the large thickness portion.

According to a second aspect of this invention, it provides a method for producing an automobile windshield molding having different cross sections in the side molding parts and the upper molding part so as to extrude the thermoplastic resin through the first plate with a fixed extrusion opening added with a variable movable devices, said method comprising the steps of:

forming side molding parts having an exterior portion, a foot portion and a large thickness portion by expanding an extrusion opening;

forming a water drain channel on the side of said large thickness portion by blocking or cutting a part of the resin and disposing of this resin separately from a molding main body; and forming an upper molding part having an exterior portion and a foot portion by narrowing down the extrusion opening and disposing of the oversupplied resin separately from the molding main body; and wherein a dividing means is provided to supply the resin into the first plate with at least two divided elements of an exterior portion and a lower portion including the large thickness portion.

The windshield molding of this invention restricts the effect of pressure fluctuations in the extrusion opening caused by the change in cross section of the large thickness portion due to the movement of the movable die or both the movable die and the movable cutter, so that the exterior portion can maintain a good appearance.

BRIEF DESCRIPTION OF THE DRAWINGS

FIG. 7 illustrates a front view of an assembly of the first plate and a movable cutter placed on a discharge port of the first plate.

FIG. 8 illustrates a side view of FIG. 7.

FIG. 9 illustrates a front view of an assembly of the first plate and the moving cutter with its most protruded position blocking a part of the extrusion opening.

DETAILED DESCRIPTION OF THE PREFERRED EMBODIMENTS

Preferred embodiments of the present invention will be described with reference to the drawings.

Figure 1:
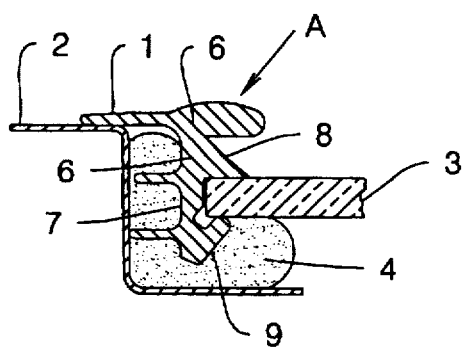
FIG. 1 illustrates a cross sectional view of a side molding part of the present invention, inserted between a windshield and a window opening of a vehicle body panel.
Figure 4:
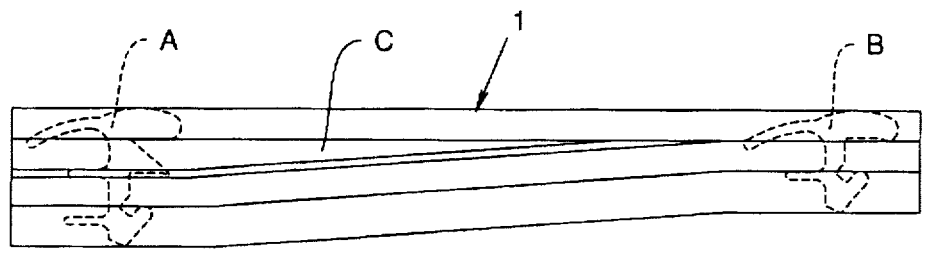
FIG. 4 illustrates a part of a windshield molding produced by the method of the present invention, where the movable die has been moved from the narrowed down position to the expanded position in the extrusion opening accompanied by movement of a movable cutter from its waiting position to an engaged position.

FIG. 1 shows a front windshield molding 1 produced by a method of the present invention. The molding 1 is made of thermoplastic resin extruded by the molding machine described hereafter as a long strip with a controlled cross section. The molding 1 is inserted into a space between a front body panel 2 of the vehicle and a windshield panel 3 and fixed by a bonding-material 4. The windshield molding 1 comprises a pair of side molding parts A (see FIG. 4) which are to be inserted into a space between each side of the windshield and each front pillar of the body panel; an upper molding part B which is to be inserted into a space between an upper side of the windshield and an upper roof portion of a front window opening of the body panel; and a pair of corner molding parts C which connect the side molding parts A and the upper molding part B. The windshield molding is formed and then installed along the front window opening of the body panel. The parts A, B and C are produced in one body by a continuous extrusion method of the present invention as described hereafter.

Each of the side molding parts A of the windshield molding 1, as shown in FIG. 1, comprise an exterior portion 6 followed by a large thickness portion 5 in which a water drain channel 8 is formed. The side molding part A also includes a foot portion 7, extending perpendicularly downward from said exterior wing portion, from the end of which is extended a flexible lip 9 to form a groove with the opposite side of back face of the large thickness portion 5 for the windshield 3 to be inserted. Therefore, double grooves are formed on each side molding part A, that is, one is a groove for the windshield 3 to be inserted into and another is a channel 8 formed above the groove for rainwater to be drained.

Figure 2:
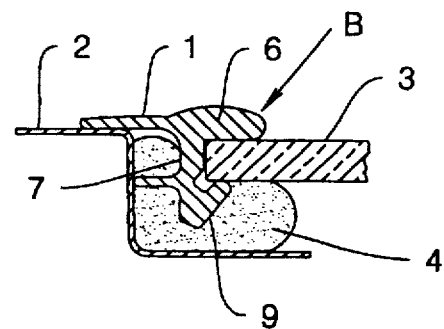
FIG. 2 illustrates a cross sectional view of an upper molding part of the present invention, inserted between a windshield and a window opening of a vehicle body panel.

The upper molding part B of the windshield molding 1, as shown in FIG. 2, comprises the exterior wing portion 6 and a foot portion 7, extending perpendicularly downward from the exterior portion 6. From the end of the foot portion 7 is extended a flexible lip 9 to form a groove with the back face of the exterior portion 6 for the windshield 3 to be inserted. Therefore, the upper molding part B is different from the side molding part A in that the upper molding part B has no large thickness portion 5 as well as no water drain channel 8.

Each of the corner molding parts C (see FIG. 4) connects each of the side molding parts A to the upper molding part B and therefore the thickness of the corner molding part C is changed gradually between the side molding part A and the upper molding part B. This means that the large thickness portion 5 of the side molding part A decreases its thickness gradually and eventually connects to the upper portion B on the corner molding part C.

Figure 3:
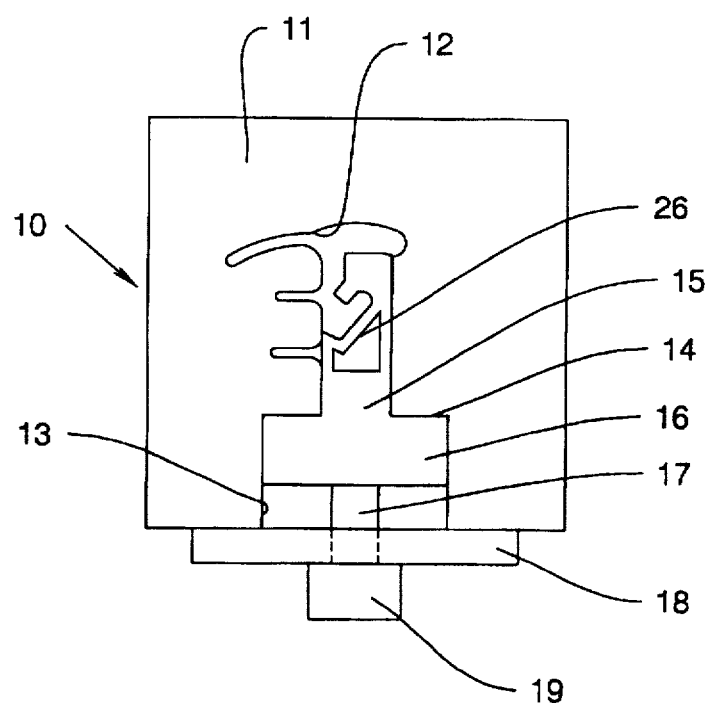
FIG. 3 illustrates a front view of an assembly of a first plate and a movable die in its narrowed down position in an extrusion opening.

The machine and method for producing the windshield molding 1 will now be described. As shown in FIG. 3, a molding machine has a first plate 10 fitted with a discharge side 11 in which an extrusion opening 12 is provided to form the exterior portion 6, the large thickness portion 5, the foot portion 7, and the flexible lip 9. On the lower side of the extrusion opening 12, a rectangular opening 13 wider than the extrusion opening 12 is provided in the discharge side 11.

The extrusion opening 12 is connected to the rectangular opening 13 through a shoulder portion 14 in the discharge side 11. A movable die 15 having a base portion 16 fitted into the rectangular opening 13 movable upward and downward is fitted into the extrusion opening 12. A first operation lever 17 of the moving die 15 is fixed on the bottom of the base portion 16 and connected on the other end so as to be passing through a stationary plate 18 to the rotary shaft of a first motor 19 fixed on the stationary plate 18 which in turn is fixed on the lower surface of the discharge side 11 so as to close the rectangular opening 13. Therefore, the movable die 15 can be moved along the extrusion opening 13 upwardly and downwardly with the first operating lever 17 driven by the first motor 19.

When the movable die is in different designated positions in the extrusion opening, the side molding part A and the upper molding part B of the molding 1 can be formed. When the movable die 15 is moved upwardly along the extrusion opening 12 by rotation of the first motor 19 until the upper surface of the base portion 16 is brought into contact with the shoulder portion 14 of the rectangular opening 13, as shown in FIG. 3, the extrusion opening is in a narrowed down position to form the cross section for the upper molding part B of the molding 1. The upper molding part B comprises an exterior portion 6, a foot portion 7 and flexible lip 9.

Figure 5:
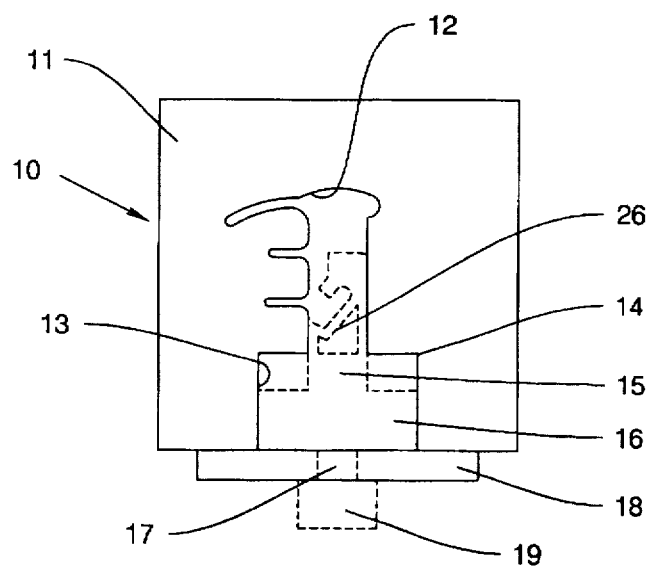
FIG. 5 illustrates a front view of an assembly of the first plate and the movable die in its expanded position in the extrusion opening.
Figure 6:
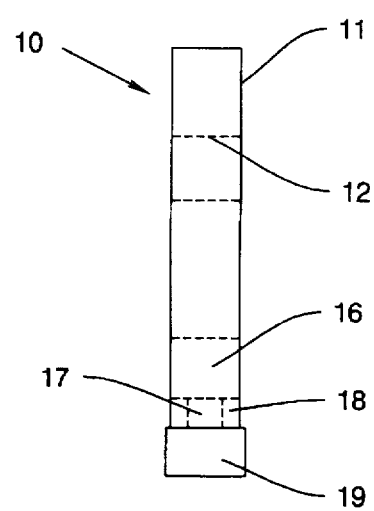
FIG. 6 illustrates a side view of FIG. 5.

When the movable die 15 is moved downward along the extrusion opening 12 with the first operating lever 17 being driven by the first motor 19 until the bottom of the base portion 16 of the moving die 15 is brought into contact with the stationary plate 18, as shown in FIG. 5, the extrusion opening is in an expanded position to form a preliminary cross section of the side molding part A. The side molding part A comprises an exterior portion 6 with a large thickness portion 5, a foot portion 7 and a flexible lip 9. This section corresponds to that of the side molding part A of the molding 1 without the water drain channel 8.

In order to form the water drain channel 8 on the side molding part A, a movable cutter 20 is provided adjacent the discharge port of the discharge side 11 of the first plate 10, as shown in FIG. 7. The movable cutter 20 comprises a cutter portion 21 which can be protruded so as to be overhanging the extrusion opening 12 formed in the discharge side 11 of the first plate 10. The cutter also comprises a base portion 23 which can be moved along a frame body 22 fixed on the side surface of the discharge side 11 of the first plate 10. On the bottom of the base portion 23 is fixed a second operation lever 25 which is connected on the other end passing through the frame body 22 to the rotary shaft of a second motor 24. The movable cutter 20 moves, when the movable die is in the expanded position in the extrusion opening 12, from the position shown in FIG. 7 to that in FIG. 9. As shown in FIG. 9, the second operation lever 25 is driven by the second motor 24 and, in the position shown in FIG. 9, the cutter portion 21 is moved so as to cut off a part of the extruded material to form the water drain channel 8, so that the side molding part A with the water drain channel can be extruded. The movable cutter 20 can adjust the depth of the water drain channel 8 by the level of extension and can adjust the cross section of the water drain channel 8 by the shape of the cutter portion 21 as well.

The extrusion of the corner molding part C is conducted during the moving process of the movable die 15 from the narrowed down position to the expanded position of the extrusion opening 12 and vice versa.

The cross sectional area of the side molding part A extruded in the expanded position of the extrusion opening 12 is larger than that of the upper molding part B extruded in the narrowed down position because part A has the large thickness portion which is not in part B. Therefore the section of the upper molding part B extruded in the narrowed down position of the extrusion opening 12 is likely to exceed the expected size because of the constant rate of the resin supply volume. In order to extrude the upper molding part B stably in the expected size, a first escape opening 26 is provided on the moving die 15 fitted in the extrusion opening 12. This opening allows the oversupplied resin to be disposed of out of the first plate 10 separately from the molding 1 when the extrusion opening is in the narrowed down position. This allows the upper molding part B to be extruded with the expected precise cross section by disposing of the oversupplied resin through the first escape opening 26.

For a similar purpose, a second escape opening 27 is provided on the movable cutter 20. So as the cutter cuts off a part of the large thickness portion 5 to form the water drain channel 8 when the extrusion opening is in the expanded position, the removed resin can be disposed of as it passes out of the first plate 10.

Figure 10:
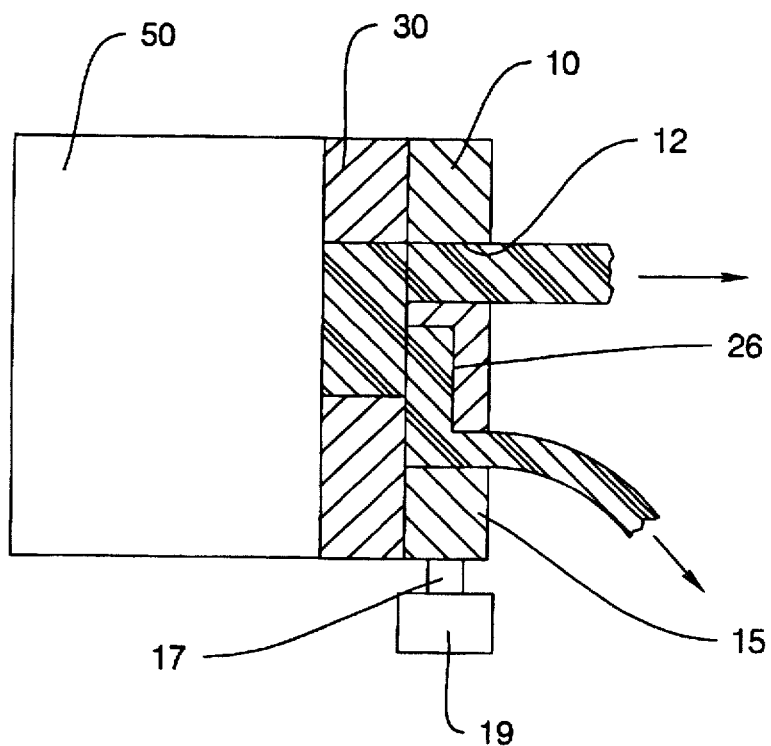
FIG. 10 illustrates a schematic cross sectional view of the machine for carrying out the method of the present invention.

FIG. 10 is a partial schematic view of the machine for carrying out the method of the present invention. A second plate 30 is placed on a discharge port (not shown) of a well-known supply means 50 and the first plate 10 is placed on a discharge port of the second plate 30. The resin material discharged from the supply means 50 goes through openings of the second plate 30 and then reaches the first plate 10 where the resin is formed into the cross section of the molding 1 and transferred out of the machine. The oversupplied resin is disposed of out of the first plate 10 through the first and the second escape openings 26 and 27 of the movable die 15 and the cutter 20. The movable cutter 20 is movable in front of the discharge port of the first plate 10 in order to form the water drain channel 8.

Figure 11:
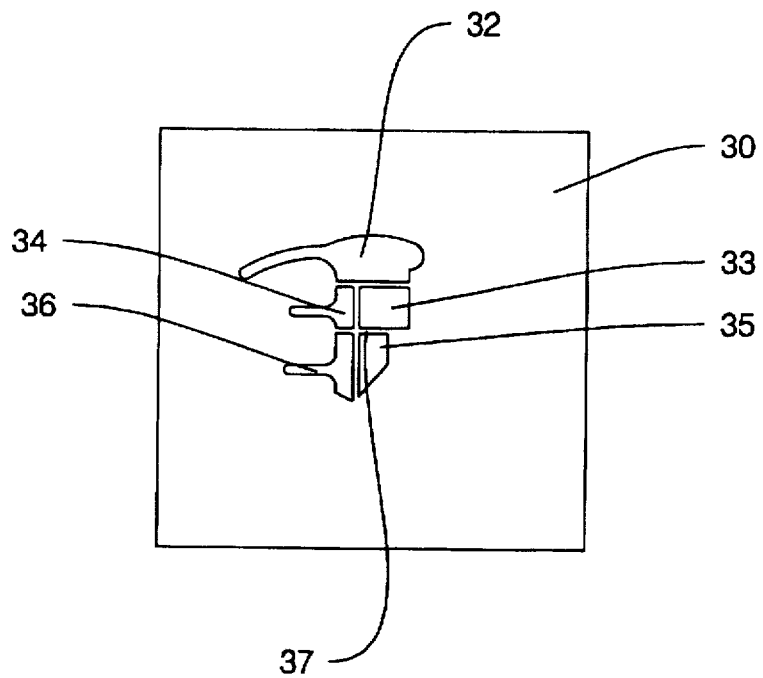
FIG. 11 illustrates a front view of a second plate of the present invention illustrating its various positions.

FIG. 11 illustrates a front view of the discharge side of the second plate 30. In this embodiment, openings on the second plate are divided into five segments. The first opening 32 corresponds to the exterior portion 6 of the molding 1 and the second opening 33 corresponds to the large thickness portion 5 where the water drain channel 8 is to be formed. The third opening 34 corresponds to the portion where the seal lip for the body panel is formed. The fourth opening 35 and the fifth opening 36 correspond to the portion where the foot portion 7 is formed. In this embodiment the fourth opening 35 and the fifth opening 36 are formed independently but may be united into one opening. Each opening 32, 33, 34, 35 and 36 is separated by a bulkhead 37 from one another. The height of the bulkhead is recommended to be equal the thickness of the second plate 30. In order to minimize the effect of the pressure fluctuation, the bulkhead may be extended to the supply means 50 side.

Figure 12:
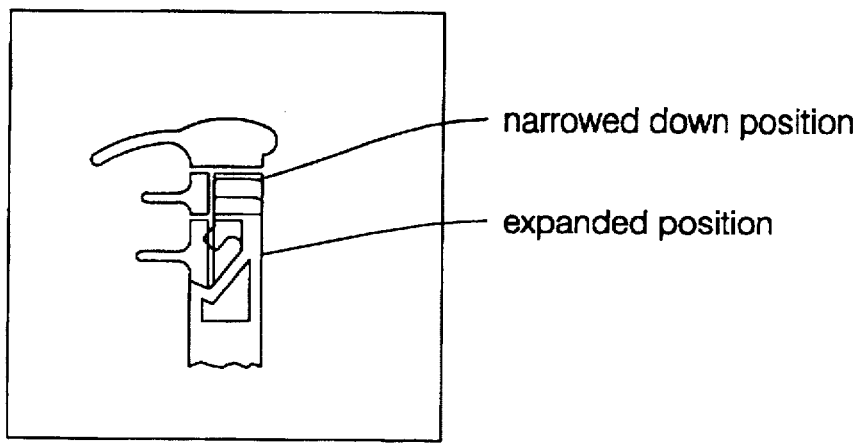
FIG. 12 illustrates the relative movement between the movable die and the second plate.

FIG. 12 illustrates the relative position of each opening of the second plate 30 to the movable die 15. The movable die 15 moves between the narrowed down position (shown by a dotted line) and the expanded position (shown by a solid line) but, in any case, remains within the range of the opening 32.

Figure 13:
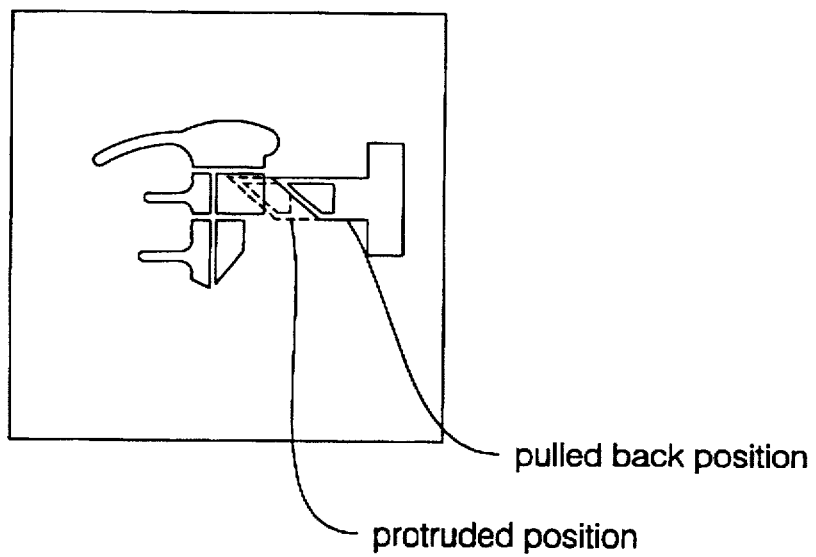
FIG. 13 illustrates the relative movement between the movable cutter and the second plate.

FIG. 13 illustrates the relative position of each opening of the second plate 30 to the moving cutter 20. The moving cutter 20 moves between the protruded position (shown by a dotted line) and the pulled back position (shown by a solid line) but, in any case, remains within the range of the opening 33.

As described above, the present invention, provides a method to restrict the effect of the pressure fluctuation in the extrusion opening caused by the change in the cross section of the large thickness portion due to the movement of the movable die or both of the movable die and the movable cutter. This produces an exterior molding portion which has a good appearance.

While the preferred embodiments of the invention have been shown and described in detail, it will be understood that the same are for illustration purposes only and should not be taken as a definition of the invention, reference being made for this purpose to the appended claims.

What is claimed is:

1. A machine for producing an automobile windshield molding comprising:

a supply means for supplying resin material;

a first plate placed adjacent a discharge port side of the supply means to provide an extrusion opening that can form a molding comprising exterior portion, a foot portion and a large thickness portion between said exterior portion and said foot portion;

a movable die placed adjacent to the extrusion opening of the supply means and disposed in the extrusion opening so as to be movable between a first position and a second position, the movable die being in the first position allows formation of the large thickness portion and the movable die being in the second position allows formation of the molding without the large thickness portion;

a movable cutter placed on a discharge side of the first plate and disposed to extend over a portion of the extrusion opening of the first plate so as to allow formation of a water drain channel on a side of the large thickness portion; and a second plate placed between the supply means and the first plate, the second plate has an opening similar in size to the extrusion opening of the first plate when said movable die is in the first position, said second plate further includes a bulkhead for dividing its opening into a plurality of openings.

2. A machine for producing an automobile windshield molding as claimed in claim 1, wherein said movable die is structured and arranged to block a part of the flowing resin material and includes an escape opening to dispose of blocked resin when the movable die is in the second position.

3. A machine for producing an automobile windshield molding as claimed in claim 1, wherein said movable cutter includes an escape opening to dispose of resin cut off by said movable cutter.

4. A machine for producing an automobile windshield molding as claimed in claim 1, wherein said bulkhead of the second plate divides the resin flow into an upper opening corresponding to said exterior portion and a lower opening corresponding to other portions of the molding.

5. A machine for producing an automobile windshield molding as claimed in claim 4, wherein said bulkhead includes a portion placed in a position to divide said lower opening into a bottom opening corresponding to said foot portion and an intermediate opening corresponding to the large thickness portion.

6. A machine for producing an automobile windshield molding as claimed in claim 5, wherein said intermediate opening corresponds to the large thickness portion and is divided longitudinally into a first opening and a second opening.

7. A machine for producing an automobile windshield molding as claimed in claim 6, wherein said movable die moves vertically in a limited area of the extrusion opening of the first plate, when the first plate and the second plate are interlocked.

8. A machine for producing an automobile windshield molding as claimed in claim 6, wherein the movable cutter moves horizontally over a limited area of the extrusion opening of the first plate when the first plate and the second plate are interlocked.

9. A machine for producing an automobile windshield molding as claimed in claim 1, wherein the bulkhead of the second plate is placed in a position where its opening is divided into one opening that corresponds to the area where the movable die moves in the first plate, when the first plate and the second plate are interlocked.

10. A machine for producing an automobile windshield molding as claimed in claim 1, wherein the bulkhead of the second plate is placed in a position where its opening is divided so as to form one opening which corresponds to the area where the movable cutter moves on the first plate, when the first plate and the second plate are interlocked.

11. A method of producing an automobile windshield molding having different cross sections between side molding parts and an upper molding part by extruding the thermoplastic resin through a first plate providing an extrusion opening, said method comprising the steps of:

forming side molding parts having an exterior portion, a foot portion and a large thickness portion by expanding the extrusion opening by moving a movable die disposed in the extrusion opening from a first position to a second position;

forming a water drain channel on a side of said large thickness portion by blocking a part of an extruded resin flow path and removing the resin in a blocked portion separately from a molding main body after extrusion from the first plate and during the blocking step;

forming an upper molding part having an exterior portion and a foot portion by narrowing down the extrusion opening by moving the movable die from the second position to the first position and disposing of the oversupplied resin separately from a molding main body; and providing a second plate between a source of thermoplastic resin and the first plate and providing the second plate with a bulkhead to supply the resin into the first plate with at least two divided elements of an exterior portion and a lower portion.

12. A method of producing an automobile windshield molding having different cross sections between side molding parts and an upper molding part by extruding the thermoplastic resin through a first plate providing an extrusion opening, said method comprising the steps of:

forming side molding parts having an exterior portion, a foot portion and a large thickness portion by expanding the extrusion opening by moving a movable die disposed in the extrusion opening from a first position to a second position;

forming method a water drain channel by moving a movable cutter on a discharge port of the first plate into a position where the movable cutter cuts off a part of the large thickness portion in order to form a water drain channel and separating the removed resin from the molding main body after extrusion from the first plate and while the movable cutter cuts off part of the large thickness portion;

forming an upper molding part having an exterior portion and a foot portion by narrowing down the extrusion opening by moving the movable die from the second position to the first position and disposing of the oversupplied resin separately from a molding main body; and providing a second plate between a source of thermoplastic resin and the first plate and providing the second plate with a bulkhead to supply the resin into the first plate with at least two divided elements of an exterior portion and a lower portion.

* * * * *